United States Patent
Mohler

(10) Patent No.: US 9,541,407 B1
(45) Date of Patent: Jan. 10, 2017

(54) EMERGENCY MAPPING SYSTEM

(71) Applicant: Avaya Inc., Santa Clara, CA (US)

(72) Inventor: David S. Mohler, Arvada, CO (US)

(73) Assignee: Avaya Inc., Santa Clara, CA (US)

( * ) Notice: Subject to any disclaimer, the term of this patent is extended or adjusted under 35 U.S.C. 154(b) by 0 days.

(21) Appl. No.: 14/806,017

(22) Filed: Jul. 22, 2015

(51) Int. Cl.
*H04W 4/00* (2009.01)
*G01C 21/30* (2006.01)
*H04W 4/02* (2009.01)
*H04W 4/22* (2009.01)

(52) U.S. Cl.
CPC ............. *G01C 21/30* (2013.01); *H04W 4/023* (2013.01); *H04W 4/22* (2013.01)

(58) Field of Classification Search
None
See application file for complete search history.

(56) References Cited

U.S. PATENT DOCUMENTS

| | | | | |
|---|---|---|---|---|
| 2005/0003797 A1* | 1/2005 | Baldwin | ............. | H04W 76/007 455/404.1 |
| 2014/0155095 A1* | 6/2014 | Albanes | ................. | H04W 4/22 455/456.3 |
| 2014/0329546 A1* | 11/2014 | Albanes | ................. | H04W 4/22 455/456.3 |
| 2016/0066161 A1* | 3/2016 | Albanes | ................. | H04W 4/22 455/456.3 |

OTHER PUBLICATIONS

"ESInet," TeleCommunication Systems, 2014, retrieved from http://www.telecomsys.com/Libraries/Collateral_Documents/ESInet_Solutions_4_page_brochure.sflb.ashx, 2 pages.
"Next Generation 9-1-1," Dispatch Magazine, 2007, retrieved from http://web.archive.org/web/20140225054654/http://www.911dispatch.com/911/nextgen_911.html, 4 pages.
"Massive communications damage and a failure to adequately plan for alternatives impaired response efforsts, command and control, and situational awareness," Communications, 2006, retrieved from http://govinfo.library.unt.edu/katrina/communications.pdf, pp. 163-181, 20 pages.
"How the UN Used Social Media in Response to Typhoon Pablo (Updated)," iRevolutions, 2012, retrieved from http://irevolution.net/2012/12/08/digital-response-typhoon-pablo/, 8 pages.
"The Response to Hurricane Sandy," U.S. Dept. of Homeland Security, NCSWIC-SAFECOM Joint Webinar Series, May 30, 2013, retrieved from http://www.npstc.org/download.jsp?tableId=37&column=217&id=2803&file=Hurricane_Sandy_Panel_Slick_Sheet_June_2013.pdf&page=NPSTC%20Home, 2 pages.
Clinch, "The Transition to Next Generation 9-1-1-in North America," 2011, retrieved from http://web.archive.org/web/20150417133748/http://pdf.911dispatch.com.s3.amazonaws.com/avaya_ng911_study_2011.pdf, 26 pages.

* cited by examiner

*Primary Examiner* — Diane Mizrahi
(74) *Attorney, Agent, or Firm* — Sheridan Ross P.C.

(57) ABSTRACT

A unified, weighted, and common language mapping system and method for disaster response is described, with the ability to overlay infrastructure damage, responder assets, data source, and weighting factors including the ability to redact such maps for dissemination to media, the public, or the like. The system and method described herein also enable the real-time updating of maps with social media information and the like.

19 Claims, 10 Drawing Sheets

EMERGENCY MAPPING SYSTEM

FIELD OF THE DISCLOSURE

The present disclosure is generally directed toward communications and, in particular, toward emergency communications systems.

BACKGROUND

A Public Safety Answering Point (PSAP) is a call center that answers calls to emergency services (e.g., ambulance, fire, police or other emergency agency such as Coast Guard in coastal areas) and can provide information and dispatch help, including one or more first responders. Counties, cities, municipalities and the like can fund one or more PSAPs to provide such emergency services.

Several problems may arise when a widespread emergency situation occurs (e.g., earthquake, flood, hurricane, tornado, tsunami, etc.). PSAPs, utilities, transportation and other infrastructure can have service interruptions or can be destroyed. Next Generation 911 (where available) has taken initial steps to solve the PSAP portion of this problem by rerouting calls to another PSAP that is still functioning (e.g., has communication capabilities and dispatch capabilities). The limitation here is whether or not the infrastructure for the wireless call (cell towers), wireline (lines and switches), Internet (service provider network) and other transmission means are still intact. Emergency Services IP Network (ESInet) and the National Emergency Number Association (NENA) with its Functional & Interface Standards for Next Generation 911 (e.g., I3) go further by using a common IP network to link PSAPs (and occasionally other emergency services).

Current solutions fall short of solving problems created by a widespread emergency as demonstrated by such events as Typhoon Pablo, Hurricane Katrina, Hurricane Sandy, and the like. In the analysis of system incompatibilities, system failures, interagency interoperability, failure of initiative and preparation, the government agencies point out many failures of 911, e911, and other emergency communication systems.

Many reports to varying degrees show that response readiness, inter-agency communication and coordination, disaster/outage mapping, public reporting, and activation of emergency resources should all be better served. Dissimilar code practices, incompatible systems and methodologies, jurisdictional boundaries, available resources, and resource capabilities all need to be better utilized in a large-scale disaster.

SUMMARY

What is proposed here is an improved method of collecting and weighting data capable of driving mapping of disaster scope, service outage mapping as it effects data collection and/or response, and a method of rule-based, near real-time coordination between response agencies and/or organizations. Accurate assessment of the scope and impact of a disaster, and effective command and control are critical to the effective deployment and utilization of first responders.

It is, therefore, one aspect of the present disclosure to provide a mechanism for creating a disaster/service outage map, showing infrastructure outages or damage, and showing deployment of response agencies and organizations that is shared across governmental and agency/organization boundaries. One problem is that NG911 (or equivalent outside the US) is not completely deployed. Another problem is that other than traditional UN, there are no defined response plans for disasters that cross country boundaries. Still another problem is the lack of weighting to filter and grade disaster information to form an accurate map of disaster scope, related service outages, and responder locations and activities. Because of this, large scale disasters are likely to continue to be met with the same problems described above.

In some embodiments, a method and apparatus are disclosed for creating/sharing various disaster maps showing the extent of a disaster, and overlaying information about infrastructure outages (such as but not limited to transit, telecommunications, emergency notification systems (such as PSAPs, FEMA-IPAWS-OPEN, etc.)), and the location and availability of emergency response resources. In order to make the best use of the most reliable data, a weighting factor is added based on the data source, the level of trust or validation of the data, and is considered when driving the various maps and their overlays. In the absence of the data being accompanied by weighting from the source, a weighting factor can be supplied by a weighting module based on historical accuracy, source, sampling size, or any of a number of other well-known data weighting factors. A centralized data broker is used for creation of multiple maps of the various aspects of the emergency.

Communication of data can be facilitated via one of several systems designed to interoperate with dissimilar systems such as, but not limited to, XML, SOAP, etc. This can allow the dissimilar systems to share data, utilizing the broker function.

The system, in some embodiments, can receive data from different sources preferably with each data set having a confidence factor associated with it. For example, if an agency has trusted data (such as a weather maps/information from trusted agencies such as the National Weather Service (NWS), the National Oceanic and Atmospheric Administration (NOAA), and/or the National Hurricane Center (NHC)) the trusted data can be passed on to the centralized broker with a high trust weighting (e.g., 10 on a scale from 1 to 10). In the absence of such weighting, the centralized broker can consider information such as the time that the data was collected, the source of the data, first-hand observations supporting the data, and the like can be used to weight the data. Thus, the data can be pre-weighted by the source and/or weighted by the centralized broker using a variety of polling and experiential factors so that the best data for a specific event can be selected. Similar data from other relevant sources for other types of events such as seismic events, terrorist events, and other large scale disasters can be treated in a similar fashion. Again, each data set would be weighted according to trust level. Social media input can be considered and used to supplement maps when it is validated by geolocation, photographic or video documentation, and adequate sample size (rather than being trusted in raw form).

Lexicons of common terms used by agencies, social media posts, and specific disciplines (atmospheric terms, geological terms, etc.) can be linked in advance or discovered by the centralized broker in contact with agencies (or common parlance in the case of text or social media acronyms). These lexicons can be utilized to create a common language understanding of the disaster that is readily shareable across all agencies and responders. It can also be published in redacted form for use by the media to inform impacted parties.

Information from public utilities (such as power, wireline communication, wireless communication, roads and mass transit facilities, etc.) can be aggregated and weighted in a similar way to the atmospheric example above to provide the best overall view of infrastructure outages and damage. Damage assessment can be added by first-hand reports from utilities and other agencies.

Information from response agencies (such as police, fire, National Guard, coast guard, FEMA, etc.) can be aggregated and weighted (temporally, in terms of capabilities, capacities, etc.) to provide the location and abilities of response assets.

A mapping module can create maps based on data sets, with one or multiple overlays of response resources, with overlays of infrastructure damage, with annotation of what data source(s) were relied upon, and with confidence weighting being displayed. Certain information can be selectively withheld (redacted) for consumption by the media, the public, or the like. In other words, each overlay may have a distribution population associated therewith that dictates which portions of the population (e.g., media, public, etc.) can view a particular overlay.

Rule-based deployment of responders can be coordinated using these maps. A rule engine can be updated with jurisdictional policy changes. Rule overrides can be provided by any competent authority. The intent is that these maps and overlays can form the basis of a shared approach to disaster command and control across jurisdictions, agencies, etc.

Experiential data can be added for system modification to improve renderings and choice of data sources to provide the best mapping functions. Feedback from media, the public, and other users can be applied to improve rendering of future redacted maps.

Another aspect of the present disclosure is to provide a text-to-speech module that is capable of transmitting an aural description of the disaster map for use by radio broadcasters and radio-based emergency notification systems such as NOAA's All Hazard Radio with Specific Area Message Encoding (SAME). Additional descriptions by human operators can be recorded and played back, ensuring consistency of message across radio broadcasts.

Other embodiments are possible without departing from the intended improvements provided by this system and method.

In some embodiments, a communication method is provided that generally comprises:

receiving information about an event from a plurality of data sources, the plurality of data sources;

determining at least one of location and time information associated with at least some pieces of information received from the plurality of data sources;

storing the at least some pieces of information along with the determined at least one of location and time information in a database;

accessing the database to obtain the at least some pieces of information along with the determined at least one of location and time information;

using the at least some pieces of information along with the determined at least one of location and time information to generate at least one of a map and a map overlay to provide a graphical understanding of the event at discrete points in time; and distributing the at least one of a map and map overlay.

The term "communication session" as used herein refers to any communication or set of communications between communication devices, whether including audio, video, text, or other multimedia data. Typically, a communication session includes two or more communication endpoints, UAs, and/or one or more communication servers (e.g., a SIP server).

The term "map" as used herein can refer to any visual and/or audible rendering of information along with an associated location for that data. The map or an overlay may be presented via a user interface of a communication device, thereby enabling a user of the communication device to see/view and/or hear the presentation of the map and/or overlay. In some embodiments, a map or overlay may be presented with a common map presentation that shows geographical boundaries, geographical features (e.g., lakes, streams, roads, walking paths, buildings, etc.), radar information, satellite images, etc. Overlays may be presented in any number of ways, for instance with a partial transparency, thereby allowing other maps and overlays to be viewed beneath the partially transparent overlay. Overlays may also be presented with complete opacity or as a portion of another set of map data (thereby creating the illusion of a single map with various types of overlay data provided thereon).

The term "communication device" or "communication endpoint" as used herein refers to any hardware device and/or software operable to engage in a communication session. For example, a communication device can be an IP-enabled phone, a desktop phone, a cellular phone, a personal digital assistant, a soft-client telephone program executing on a computer system, etc.

The term "Session Initiation Protocol" (SIP) as used herein refers to an IETF-defined signaling protocol, widely used for controlling multimedia communication sessions such as voice and video calls over Internet Protocol (IP). The protocol can be used for creating, modifying and terminating two-party (unicast) or multiparty (multicast) sessions consisting of one or several media streams. The modification can involve changing addresses or ports, inviting more participants, and adding or deleting media streams. Other feasible application examples include video conferencing, streaming multimedia distribution, instant messaging, presence information, file transfer and online games. SIP is as described in RFC 3261, available from the Internet Engineering Task Force (IETF) Network Working Group, November 2000; this document and all other documents describing SIP are hereby incorporated by reference in their entirety for all that they teach.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

The term "network" as used herein refers to a system used by a communication platform to provide communications between communication endpoints. The network can consist of one or more user relation elements, feature servers, communication endpoints, etc. that allow communications, whether voice or data, between two users. A network can be any network or communication system as described herein below. Generally, a network can be a local area network (LAN), a wide area network (WAN), a wireless LAN, a wireless WAN, a Voice over IP (VoIP) network, the Internet, etc. that receives and transmits messages or data between devices to facilitate communication platform activities. A network may communicate in any format or protocol known in the art, such as, transmission control protocol/internet protocol (TCP/IP), 802.11g, 802.11n, Bluetooth, or other formats or protocols.

The term "database," "archive," or "data structure" as used herein refers to any system, hardware, software, memory, storage device, firmware, component, etc., that stores data. The data model can be any type of database or storage framework, which is stored on any type of non-transitory, tangible computer readable medium. A database can include one or more data structures, which may comprise one or more sections or portions that store an item of data. A section may include, depending on the type of data structure, an attribute of an object, a data field, or other types of sections included in one or more types of data structures. The data structure can represent a text string or be a component of any type of database, for example, relational databases, flat file databases, object-oriented databases, or other types of databases. Further, the data structures can be stored in memory or memory structures that may be used in either run-time applications or in initializing a communication.

The term "computer-readable medium" as used herein refers to any tangible storage that participates in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, or any other medium from which a computer can read. When the computer-readable media is configured as a database, it is to be understood that the database may be a graph database as described herein. Accordingly, the disclosure is considered to include a tangible storage medium and prior art-recognized equivalents and successor media, in which the software implementations of the present disclosure are stored.

The terms "determine", "calculate", and "compute," and variations thereof, as used herein, are used interchangeably and include any type of methodology, process, mathematical operation or technique.

The term "module" as used herein refers to any known or later developed hardware, software, firmware, artificial intelligence, fuzzy logic, or combination of hardware and software that is capable of performing the functionality associated with that element. Also, while the disclosure is described in terms of exemplary embodiments, it should be appreciated that individual aspects of the disclosure can be separately claimed.

BRIEF DESCRIPTION OF THE DRAWINGS

The present disclosure is described in conjunction with the appended figures.

DETAILED DESCRIPTION

The ensuing description provides embodiments only, and is not intended to limit the scope, applicability, or configuration of the claims. Rather, the ensuing description will provide those skilled in the art with an enabling description for implementing the embodiments. It being understood that various changes may be made in the function and arrangement of elements without departing from the spirit and scope of the appended claims.

It should be appreciated that embodiments of the present disclosure can be utilized in numerous environments such as computing environments, mobile environments, distributed communication environments, and the like.

Furthermore, while the illustrative embodiments herein show the various components of a system collocated, it is to be appreciated that the various components of the system can be located at distant portions of a distributed network, such as a communication network and/or the Internet, or within a dedicated secure, unsecured, and/or encrypted system. Thus, it should be appreciated that the components of the system can be combined into one or more devices, such as an enterprise server or collocated on a particular node of a distributed network, such as an analog and/or digital communication network. As will be appreciated from the following description, and for reasons of computational efficiency, the components of the system can be arranged at any location within a distributed network without affecting the operation of the system. For example, the various components can be located in a local server, at one or more users' premises, or some combination thereof.

Figure 1:
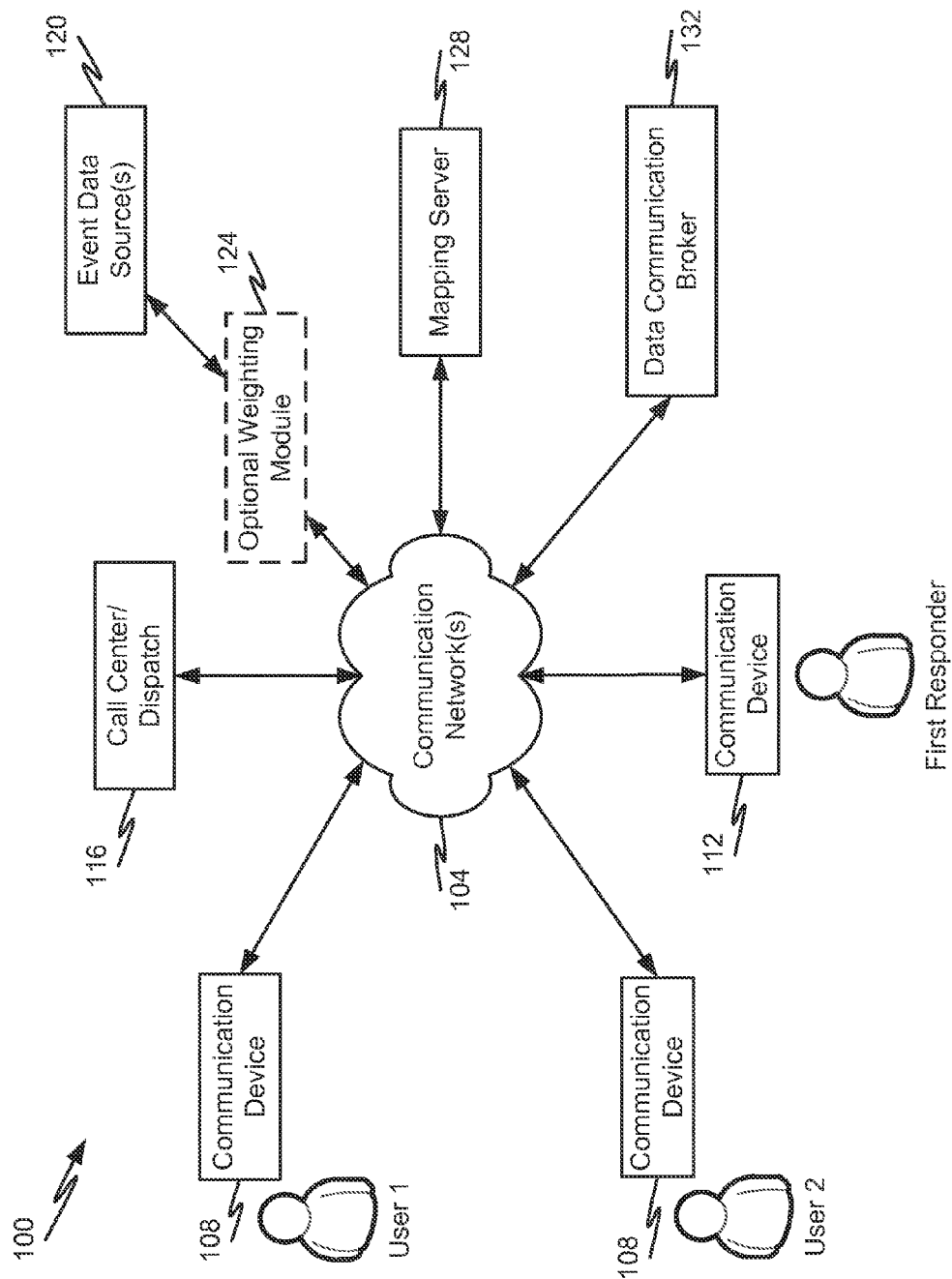
FIG. 1 is block diagram depicting a communication system in accordance with embodiments of the present disclosure.

With reference initially to FIG. 1, an illustrative communication system 100 will be described in accordance with at least some embodiments of the present disclosure. The system 100 is shown to include a communication network 104 that enables communications between one or more communication devices 108, 112. In addition to enabling communications between communication devices 108, 112, the communication network 104 may also enable the communication devices 108, 112 to connect to other communication elements (e.g., servers, call centers, call center components, etc.) that provide services as will be described in further detail herein. In some embodiments, the communication network 104 may be packet-switched and/or circuit-switched. An illustrative communication network 104 includes, without limitation, a Wide Area Network (WAN), such as the Internet, a Public Switched Telephone Network (PSTN), a Plain Old Telephone Service (POTS) network, a cellular communications network, an IP Multimedia Subsystem (IMS) network, a SIP network, a Voice over IP (VoIP) network, or combinations thereof. In one configuration, the communication network 104 is a public network supporting the TCP/IP suite of protocols. The communication network 104 may alternatively or additionally include one or more private networks, for instance a Local Area Network (LAN), a series of LANs connected by one or more WANs, a Virtual Private Network (VPN), a Peer-to-Peer (P2P) network, a proximity-based network (e.g., a network established using 802.11x protocols). For instance, the communication network 104 may include an enterprise communication network whose security is maintained with internal policies and firewalls. The depiction of a generic communication network 104 is for ease of understanding the details of the present disclosure and is not intended to limit the scope of the claims to a single network. In most circumstances, the communication network 104 is likely a collection of multiple networks, which may or may not utilize the same communication protocols and/or addressing schemes.

The communication devices 108, 112 may correspond to devices that are connected directly to and are a part of a private network (e.g., enterprise communication devices) or they may correspond to devices connected to a public communication network. Illustrative types of communication devices 108, 112 include, without limitation, cellular phones, smartphones, laptops, tablets, Personal Computers (PCs), Personal Digital Assistants (PDAs), digital phones, analog phones, softphones, or any other endpoint capable of having supporting communication capabilities. In some embodiments, the communication devices 108, 112 may also comprise the ability to receive and communicate (e.g., via graphical display or audibly) map information to a user of the communication device 108, 112.

FIG. 1 shows different types of communication devices 108, 112, but it should be appreciated that the communication device 108 carried by a typical user may be similar or identical to the communication device 112 carried by a responder for an emergency event. In some embodiments, the communication device 112 of a first responder may be provided with different types of data (e.g., map data, dispatch instructions, etc.) than a communication device 108 carried by a typical user. In some embodiments, the communication device 112 carried by a first responder may have a purpose-built application or suite of applications provided thereon that enable direct (and optionally encrypted) communications with dispatch personnel at a call center 116. These purpose-built applications or suite of applications may also provide a customized view or GUI for map data whereas a communication device 108 carried by a typical user may simply render map data with a web browser or generic map application, for example.

In some embodiments, one or more servers may be connected to the communication network 104 to facilitate the understanding of an emergency event in addition to dispatching resources in connection with the emergency event. The servers depicted herein may be considered part of a collection of servers maintained using common maintenance protocols, such as a server cluster. The servers or collection of servers in FIG. 1 are shown to include a call center/dispatch 116, a mapping server 128, and a data communication broker 132. Although these components are depicted as being separate, it should be appreciated that the call center/dispatch 116 may include the mapping server 128 functionality and data communication broker functionality 132.

The call center/dispatch 116 may comprise a collection of components for emergency response purposes. In the United States, the call center 116 may be implemented as an E911 call center having call routing functions and communication capabilities that enable emergency call center agents to respond to emergency calls. The call center/dispatch 116 may also have facilities that enable a coordinated dispatch of first responder resources in and around an area of an emergency event.

The mapping server 128 may be configured to generate maps and/or overlays for maps to be presented to agents in the call center/dispatch 116 in addition to being presented to users and first responders via their respective communication devices 108, 112. The mapping server 128 may comprise the ability to receive event data from event data source(s) 120 and manipulate the data to generate maps and/or overlays. The mapping server 128 may generate complete maps with its own map data. These maps may include satellite images or street views of geographical locations. Alternatively, or additionally, the mapping server 128 may generate one or more overlays based on data received from event data sources 120, such that the overlays can be displayed on top of (e.g., above) other map data in a semi-transparent manner.

The data source(s) 120 may correspond to sensors or sensor networks disposed in geographical proximity to an emergency or emergent event. Data sources 120 may also correspond to news feeds, social media feeds, weather feeds, communication devices 108 of users, communication devices 112 of first responders, sensors on communication devices 108, 112, communications transmitted by users/first responders (e.g., emails, calls, pictures, videos, texts, etc.), medical reports, satellite images, video camera feeds, streaming media, etc. As will be discussed in further detail herein, the amount to which data from a data source 120 contributes or alters a map or overlay produced by the mapping server 128 may depend upon its trustworthiness.

The trustworthiness of a data source 120 or individual pieces of data received from data sources 120 may depend upon a weighting assigned to the data source 120 or individual pieces of data issued by the data source 120. The weighting of data and/or data sources 120 may be provided by an optional weighting module 124. In some embodiments, certain types of data sources (e.g., accredited or historically-verified data sources) may have greater weights as compared to other data sources (e.g., social media feeds, information obtained by word of mouth versus first-hand witnessing, etc.) Those types of data sources having greater weights may be allowed to contribute more heavily to the maps and/or overlays produced by the mapping server 128. It should also be appreciated that certain types of data from data sources may have higher weighting than others. For instance, if a data source has a particular area of expertise (e.g., doctors providing medical data, army corps of engineers providing structural integrity data, Coast Guard providing emergency response data, etc.), then data received from the data source in the area of expertise may be given more weight than other data received from the same data source if that other data is not in the area of expertise.

Furthermore, data sources that are more proximally close to an epicenter of an event (or within the boundaries of an event) may be considered to have more accurate information regarding an event than those data sources that are not as proximally close to the event. In such a situation, the data source 120 that is closer to the event may be given a greater weight by the optional weighting module 124 than data sources 120 that are not as close.

It should be appreciated that the data and/or data sources 120 may be weighted by the optional weighting module 124 when the data is generated, as the data travels from the data source(s) 120 to the mapping server 128, and/or at the mapping server 128. The location where the data and/or data source(s) 120 are weighted may depend upon the levels of trust that exist between a mapping server 128 and data source 120. For instance, a data source 120 that has proven its trustworthiness over an extended span of time (e.g., years or multiple events) may be allowed to weight their own data for application by the mapping server 128 whereas other unproven data sources 120 may have their data weighted by the mapping server 128.

The data communication broker 132 may be provided to facilitate communications between different systems or networks that are not natively compatible with communicating with one another. For instance, the data communication broker 132 may be configured to receive dispatch instructions from the call center/dispatch 116 and translate them prior to issuing the dispatch commands to a first responder's communication device 112. The data communication broker 132 may also control the flow of map and/or overlay information to different populations/groups of people depending upon their permissions for such information. In some embodiments, the data communication broker 132 may be configured to analyze lexicons of common terms used by agencies, social media posts, and specific disciplines (atmospheric terms, geological terms, etc.) and then link those common terms in advance with agencies (or common parlance in the case of text or social media acronyms). The data communication broker 132 may be configured to utilize these lexicons to create a common language understanding of the disaster that is readily shareable across all agencies and responders. The common language understanding can also be published in redacted form for use by the media to inform impacted parties. The data communication broker 132 may be included as part of the call center/dispatch 116, although such a configuration is not required.

Figure 2:
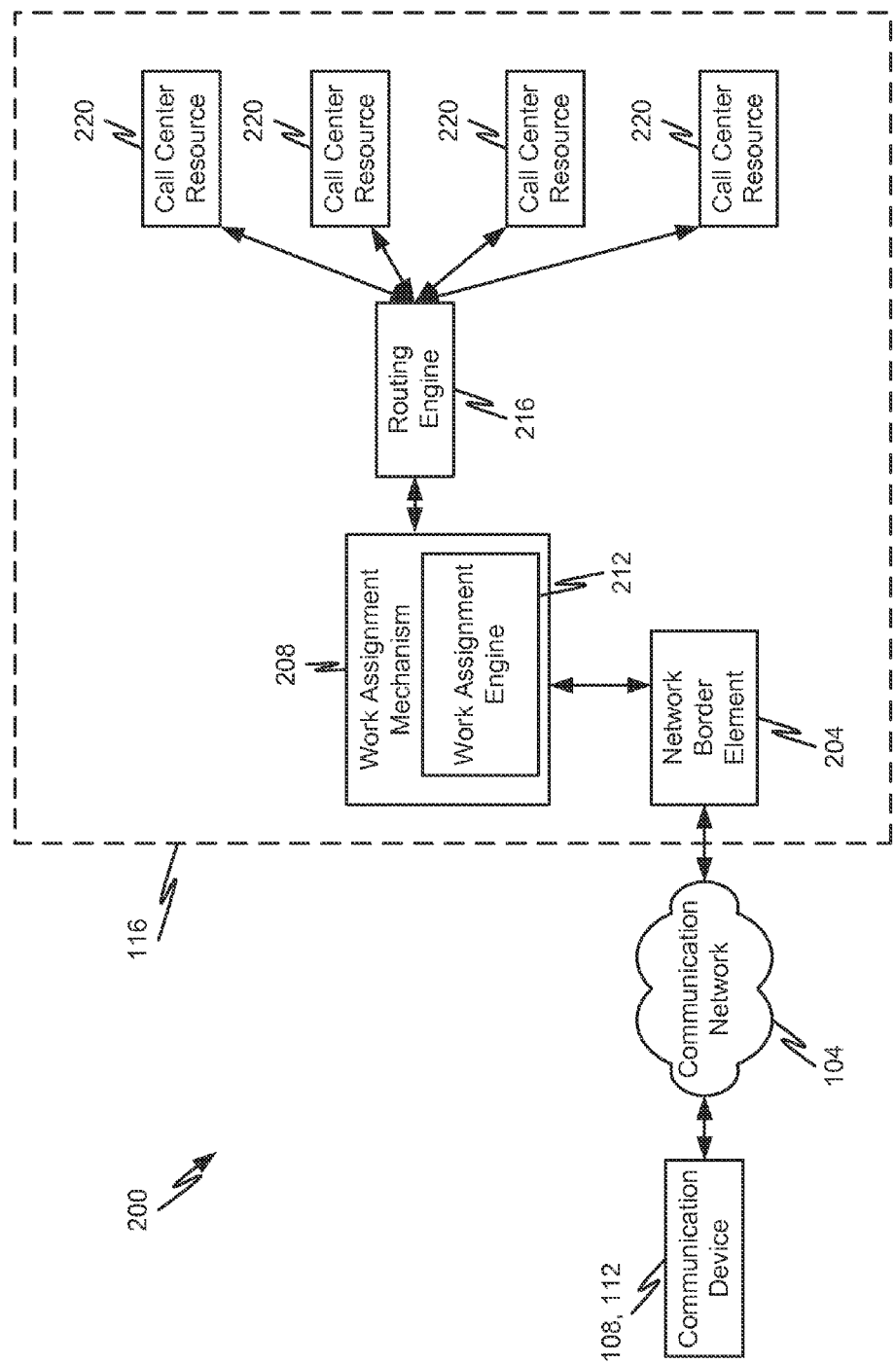
FIG. 2 is a block diagram depicting details of a call center in accordance with embodiments of the present disclosure.

With reference now to FIG. 2, additional details of a call center/dispatch 116 will be described in accordance with embodiments of the present disclosure. The call center 116 is shown to include a network border element 204, a work assignment mechanism 208, a work assignment engine 212, a routing engine 216, and a plurality of call center resources 220. Although the term "call center" is used herein to describe the emergency response and dispatch center 116, it should be appreciated that the call center 116 can handle media types other than voice calls. For instance, the call center 116 may be configured to handle contacts of a variety of types including, without limitation, video calls, text/SMS contacts, email contacts, social media contacts, etc. Thus, the term "call center" should not be construed as limiting the present claims to handling of calls only, but rather is a generic term for any combination of communications equipment that facilitates emergency response efforts as described herein. The call center 116 may be owned and operated by one or multiple private, semi-private, or public/governmental entities. As an example, the call center 116 may correspond to an E911 emergency response unit operated by governmental employees and administered by a governmental agency. The plurality of resources 220 may correspond to communication devices that are operated by contact center agents and enable the agents to communicate with users or responders at their communication devices 108, 112.

The network border element 204 may correspond to one or multiple communication devices that reside between communication networks. In some embodiments, the network border element 204 may provide security for the call center 116 from the untrusted communication network 104. In some embodiments, the network border element 204 may comprise firewall functionality that helps protect the network of the call center 116 from unwanted computer viruses and attacks. The network border element 204 may alternatively or additionally comprise a network gateway function, address translation functions, protocol translation functions, and so on.

The communication devices 108, 112 may correspond to user communication devices or first responder communication devices as discussed above. In accordance with at least some embodiments of the present disclosure, a user may utilize their communication device 108 to initiate a work item (e.g., an emergency contact, emergency call, etc.), which is generally a request for a processing resource 220. Illustrative work items include, but are not limited to, a contact directed toward and received at a contact center 116, a web page request directed toward and received at a server farm (e.g., collection of servers), a media request, an application request (e.g., a request for application resources location on a remote application server, such as a SIP application server), and the like. The work item may be in the form of a message or collection of messages transmitted over the communication network 104. For example, the work item may be transmitted as a telephone call, a packet or collection of packets (e.g., IP packets transmitted over an IP network), an email message, an Instant Message, an SMS message, a fax, and combinations thereof. The call center resources 220 may also comprise the ability to transmit messages, map data, overlays, and other dispatch instructions to communication devices 112 of first responders, thereby coordinating the efforts of first responders.

In some embodiments, the communication may not necessarily be directed at the work assignment mechanism 208, but rather may be on some other server in the communication network 104 where it is harvested by the work assignment mechanism 208, which generates a work item for the harvested communication. An example of such a harvested communication includes a social media communication that is harvested by the work assignment mechanism 208 from a social media network or server.

The format of the work item may depend upon the capabilities of the communication device 108, 112 and the format of the communication. In some embodiments, work items are logical representations within a contact center of work to be performed in connection with servicing a communication received at the contact center (and more specifically the work assignment mechanism 208).

In some embodiments, the communication associated with a work item may be received and maintained at the work assignment mechanism 208, a switch or server connected to the work assignment mechanism 208, or the like until a resource 220 is assigned to the work item representing that communication at which point the work assignment mechanism 208 passes the work item to a routing engine 216 to connect the communication device 108, 112 which initiated the communication with the assigned resource 220. The selection of the appropriate resource from the plurality of resources 220 may be performed by the work assignment engine 212 using any type of contact center work/agent assignment logic.

Although the routing engine 216 is depicted as being separate from the work assignment mechanism 208, the routing engine 216 may be incorporated into the work assignment mechanism 208 or its functionality may be executed by the work assignment engine 212.

In accordance with at least some embodiments of the present disclosure, the work item is sent toward a collection of processing resources 220 via the combined efforts of the work assignment mechanism 208 and routing engine 216.

The resources 220 can either be completely automated resources (e.g., Interactive Voice Response (IVR) units, processors, servers, or the like), human resources utilizing communication devices (e.g., human agents utilizing a computer, telephone, laptop, etc.), or any other resource known to be used in call centers.

In some embodiments, the work assignment mechanism 208 comprises a work assignment engine 212 which enables the work assignment mechanism 208 to make intelligent routing decisions for work items. The work assignment engine 212 may reside in the work assignment mechanism 208 or in a number of different servers or processing devices. In some embodiments, cloud-based computing architectures can be employed whereby one or more components of the work assignment mechanism 208 are made available in a cloud or network such that they can be shared resources among a plurality of different users.

Figure 3:
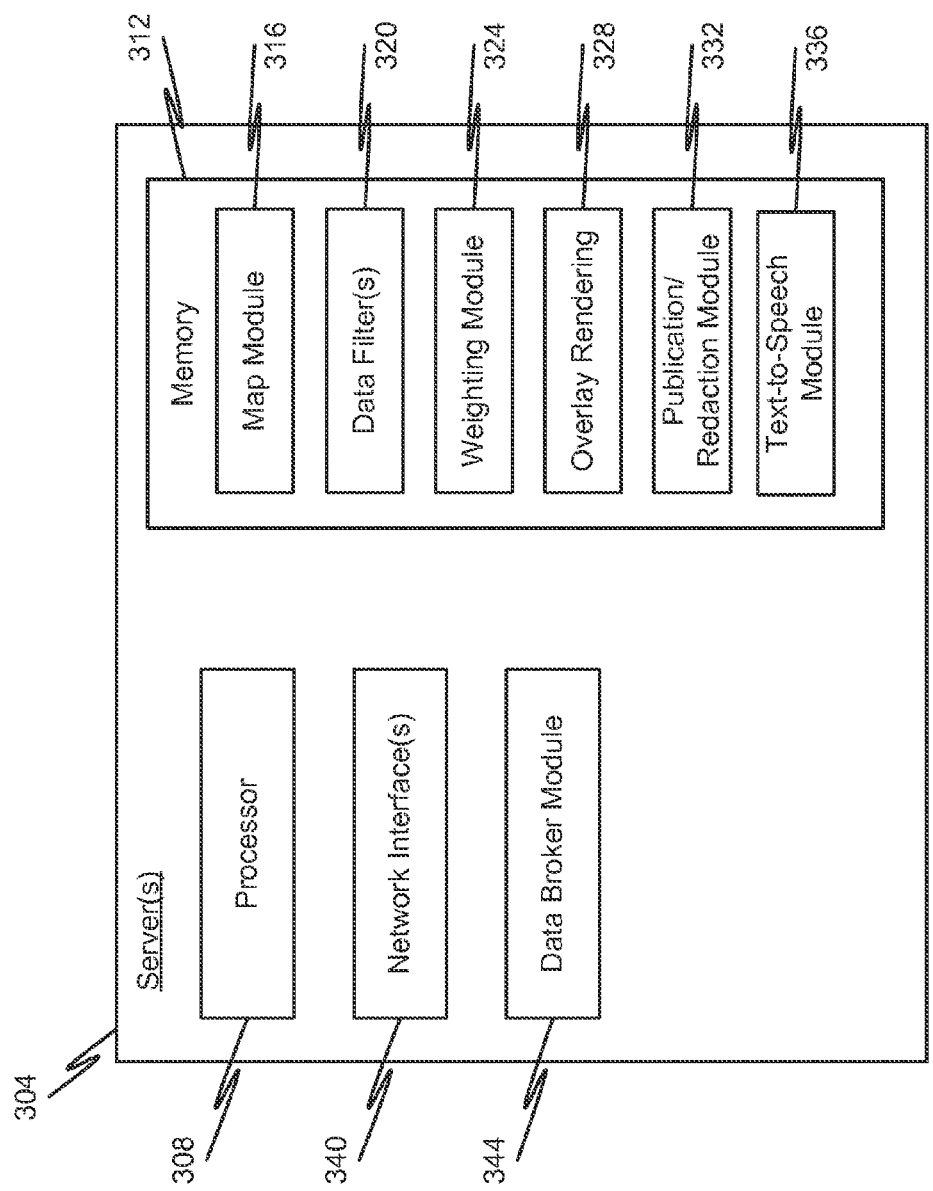
FIG. 3 is a block diagram depicting details of a server in accordance with embodiments of the present disclosure.

With reference now to FIG. 3, additional details of a server 304 will be described in accordance with at least some embodiments of the present disclosure. The server 304 may correspond to any one of the servers or components depicted in FIG. 1 or 2. Examples of components that may be implemented on the server(s) 304 include, without limitation, the call center 116, the data sources 120, the mapping server 128, the data communication broker 132, the work assignment mechanism 208, the routing engine 216, or combinations thereof. The server 304 is shown to include a processor 308, memory 312, one or more network interfaces 340, and a data broker module 344.

The processor 308 may correspond to one or multiple processors or controllers that are known for use in servers 304 and similar computational components. The processor 308 may correspond to a microprocessor in some embodiments and may be configured to execute computer-readable instructions stored in memory 312, thereby facilitating any of the behaviors of a server 304 described herein. In other embodiments, the processor 308 may include one or more Integrated Circuit (IC) chips.

The memory 312 may include any type of non-transitory computer-readable memory that is either volatile or non-volatile in nature. The memory 312 may include types of computer memory like FLASH memory, RAM, ROM, PROM, EEPROM, or the like. In the depicted embodiments, the memory 312 includes instructions in the form of a map module 316, one or more data filters 320, a weighting module 324, an overlay rendering module 328, a publication/redaction module 332, and a speech-to-text module 336. When executed by processor 308, the instructions may facilitate the desired behavior of the server 304.

In particular, the map module 316 may, when executed, perform functions related to building/generating maps and/or overlays for maps. In some embodiments, the map module 316 may enable the server 304 to behave like the mapping server 128 depicted in FIG. 1. Specifically, map information can be distributed to individuals and otherwise non-compliant systems to coordinate emergency response efforts. The map module 316 can facilitate the generation of map and overlay information that is eventually distributed to users, first responders, and other emergency response agencies/entities.

The data filter(s) 320 may, when executed by the processor 308, enable the server(s) 304 to filter certain types of data or data sources 120 such that only data of interest is analyzed, stored, and maintained in a map database. Data filters 320 that may be applied to data received from data sources may include proximity filters (e.g., only allow data from data sources within a predetermined distance of an epicenter of an emergency to be analyzed and stored), trust filters (e.g., only allow data from data sources having above a threshold weight assigned thereto), and any other automated filter that can remove data that either complies or fails to comply with the filter criteria.

The weighting module 324 may correspond to instructions that, when executed by the processor 308, enable the server(s) 304 to weight certain data sources 120 or specific pieces of data received from data sources 120. In particular, the weighting module 324 may enable the server(s) 304 to behave similarly or identically to the optional weighting module 124 depicted in FIG. 1.

The overlay rendering 328 may correspond to rendering instructions for some or all overlays generated by the map module 316. In particular, the overlay rendering 328 may include HTML, XML, or some other executable set of instructions that enable a browser or purpose-built application on a communication device to render a display of overlays generated by the map module 316. The overlay rendering module 324 may also provide the instructions that ensure overlays are properly positioned with respect to other map data (e.g., satellite images, street maps, etc.).

The publication/redaction module 332 may correspond to instructions that, when executed by the processor 308, enable the server(s) 304 to limit or control the amount and/or type of map/overlay information distributed to various user groups. For instance, first responders may receive map/overlay information of a first type (due to having a first set of permissions) whereas normal users and/or social media users may receive map/overlay information of a second type (due to having a second set of permissions), which is likely a subset of the first type of information received by the first responders. In some embodiments, the publication/redaction module 332 may completely limit maps and/or overlays that are provided to certain user groups. In other embodiments, the publication/redaction module 332 may redact certain portions of maps and/or overlays for certain user groups, but still provide the maps and/or overlays to all user groups (even though certain user groups will receive redacted versions of the maps and/or overlays).

The text-to-speech module 336 may comprise instructions that enable the server(s) 304 to convert text or graphical presentations of map data into aural/audible presentation. In particular, the text-to-speech module 336 may comprise instructions that convert map data and overlays into descriptions of boundaries and descriptions of locations of certain events and/or data sources 120. Similar to plot descriptions that are used to describe geographical areas, the text-to-speech module 336 may receive map data and/or overlays then automatically convert that map data and/or overlays into aural descriptions. For instance, locations of certain data sources 120 and the information received therefrom can be described relative to landmarks or known geographical locations (e.g., "first data source reports X condition 5.5 miles SSE of landmark N, which is near the intersection of Road A and Road B."). This aural presentation of map and/or overlay information can be used for sight-impaired users as well as for distribution via radio and other audio-only emergency broadcasts.

The network interface(s) 340 may include any type of computing interface that enables device-to-device communications. In some embodiments, the network interface 340 may correspond to a direct communication interface (e.g., Bluetooth, USB, etc.). In other embodiments, the network interface 340 may correspond to an interface that enables the server 304 to communicate over the communication network 104. Non-limiting example of the network interface 340 include an Ethernet port, an 802.11x interface, a cellular interface, a serial communication interface, or the like.

The data broker module 344 may comprise components or elements that enable the server(s) 304 to behave similar or identical to the data communication broker 132. Although not depicted as instructions in memory 312, it should be appreciated that the data broker module 344 can be implemented as instructions in memory 312.

Figure 4:
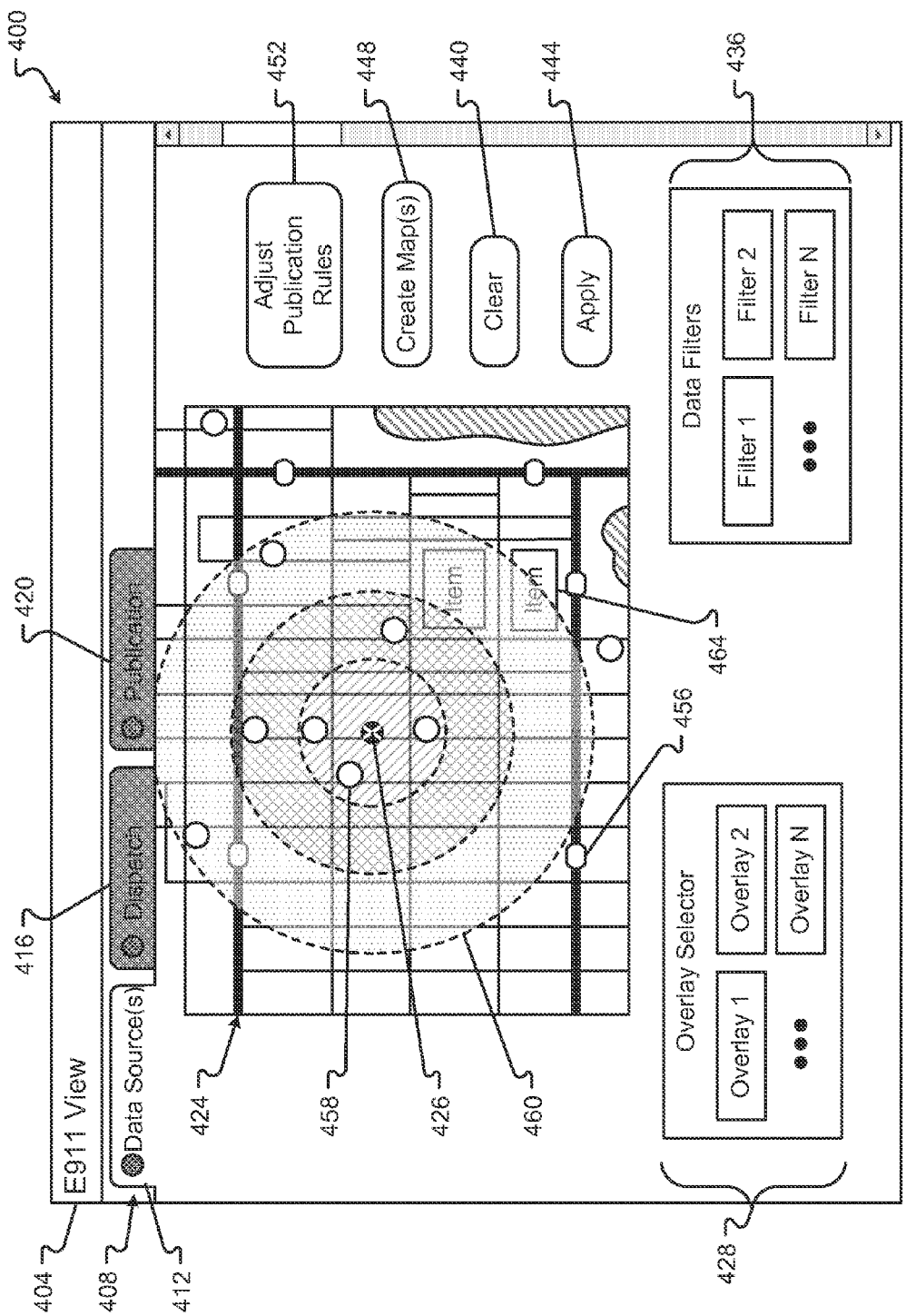
FIG. 4 is a diagram depicting an illustrative Graphical User Interface (GUI) showing map data for an event in accordance with embodiments of the present disclosure.

With reference now to FIG. 4, details of an illustrative graphical user interface 400 will be described in accordance with embodiments of the present disclosure. The graphical user interface 400 may correspond to an interface presented to a call center agent via their respective computer or communications equipment. Alternatively or additionally, some or all of the information presented to an agent as shown in FIG. 4 may be presented to a first responder via their communication device 112 and/or to a user via their communication device 108. The graphical user interface 400 is meant to be a non-limiting illustration of the types of information that can be displayed to users, responders, call center agents, and/or dispatchers.

The graphical user interface 400 is shown to include a viewing window 404, which may correspond to a view window of a web browser application or a view window of a purpose-built emergency response application. The viewing window 404 may provide access to a plurality of different view tabs 408, which can illustratively include a data sources view tab 412, a dispatch view tab 416, and a publication view tab 420. Additional details of the data sources view tab 412 are depicted and will be described in connection with FIG. 4. Information from the data sources view tab 412 may be presented via the other tabs 416, 420 in different formats along with other types of information or options for interfacing with the information. For instance, the dispatch view tab 416 may present data source information along with the maps and/or overlays that have been distributed for purposes of dispatching first responders and other field resources. The publication view tab 420 may provide additional information regarding overlays and/or maps and the user groups that are allowed to receive that information. The publication view tab 420 may also provide the call center agent with options for performing text-to-speech conversions as described herein.

Although the viewing window 404 is shown as being a window presented to a call center agent, it should be appreciated that other communication devices 108, 112 may present similar graphical user interfaces and/or information such as is shown in viewing window 404. The sharing of common map and/or overlay information may assist in the real-time dispatch of field resources, even when those resources do not have communication systems, protocols, or languages in common. For instance, a map or overlay can be shared with a plurality of different responder groups (e.g., French emergency responders, Swiss emergency responders, and German emergency responders) for an emergency in an area common to all three responder groups. Even though the different responder groups do not necessarily speak the same language or have common communications equipment to interface with common communication protocols, the maps provide a universal way of communicating dispatch instructions as well as updating each group about the nature and extent of an emergency and surrounding areas.

In some embodiments, the data sources view tab 412 may present a map 424 of an emergency area. The map 424 may include a presentation of an event epicenter 426 (or center of mass) along with event boundary lines 460 showing the extent of the event relative to the epicenter 426. The map 424 may also present locations of data sources 456 (some of which may be located within the affected area and some of which may be located outside of the affected area. The data sources 456 that traditionally have a location relative to an event may correspond to first responders and their communication devices 112, users and their communication devices 108, and/or sensors (e.g., cameras, wind sensors, moisture sensors, acoustic sensors, vibration sensors, light sensors, etc.) positioned within the view window of the map 424. Other data sources 120 that are not presented in the map 424 may include media outlets, government agencies, social media feeds, and the like.

In addition to depicting locations of data sources 456, the map 424 may also depict locations of points of interest 458. The points of interest 458 may correspond to rendezvous points or target locations for responders to move towards, locations to avoid, locations of known or potential hazards, and the like. By identifying locations of points of interest 458, the call center agent can effectively dispatch all first responders in an efficient manner simply by sharing some or all of the map 424 with the first responders. Likewise, media outlets (traditional or social) can be updated as to the status of the emergency event by receiving some or all of the information in the map 424. This information can then be communicated to the larger population via the media outlet.

The map 424 may also depict locations of various items 464 relative to the epicenter 426, data sources 456, and points of interest 458. Unlike points of interest 458, the items 464 may simply correspond to structures, buildings, monuments, bodies of water, streets, intersections, or the like which have a generally fixed location and can serve as points of reference for locating or describing locations of the epicenter 426, data sources 456, and points of interest 458. Items 464 may be particularly useful when converting the presentation of the map 424 to an aural description of the map as locations of the epicenter 426, data sources, and/or points of interest 458 can be audibly described with respect to items 464.

The viewing window 404 may additionally provide the call center agent with interface options that enable the agent to manipulate the presentation of the map 424, the manner in which data sources 120, 456 are weighted, the distribution of the map 424 or overlays presented on the map, and the like. The examples of interface options may include, but are not limited to, overlay selection options 428, data filter options 436, publication adjustment options 452, map creation options 448, clear options 440, and apply options 444. It should be appreciated that some or all of the interface options may also be presented to users and first responders, thereby allowing those users and first responders to adjust/personalize their view of the map 424 or the information they are receiving from the call center/dispatch 116.

As can be appreciated, the call center agent's presentation of the map 424 may be continuously updated in real time as additional information is received from data sources 120, 456 and that information may cause the various elements of the map to move, expand, contract, etc. It may be inefficient for the agent to share each and every view of their map 424 with all concerned parties. Rather, the agent may select various overlays with the overlay selection 428 to view at a given time. The types of overlays that may be selected include, without limitation, data source depiction overlays, item overlays, satellite image overlays, event boundary overlays, dispatch overlays, etc.

The agent may also select one or multiple data filters 436 to apply in connection with adjusting the presentation of information via the map 424. The filters may be applied to the data prior to generating the map (e.g., to limit the amount of data used to generate the map 424). Alternatively, the filters may be applied after the map is generated, but prior to the map being rendered for presentation on the viewing window 404. In other words, a single map or overlay may be generated and then each user may customize their view of the map by applying filters thereto.

The clear and apply inputs 440, 444 may be used to clear and/or apply the selections made in the overlay selector 428 and/or data filter selector 436. The create maps 448 may be used by the agent to define a map view (e.g., a point in time where a particular map view or overlay view should be generated based on the current view of the map 424 in the viewing window 404). When a map is created, that map may then be distributed to users, first responders, and other interested parties. In other embodiments, the selection of the create maps input 448 may cause the agent's view to switch to the dispatch viewing tab 416. Similarly, selection of the adjust publication rules 452 may cause the agent view to switch to the publication viewing tab 420, thereby allowing the agent to adjust publication rules for maps and/or overlays as appropriate.

Figure 5:
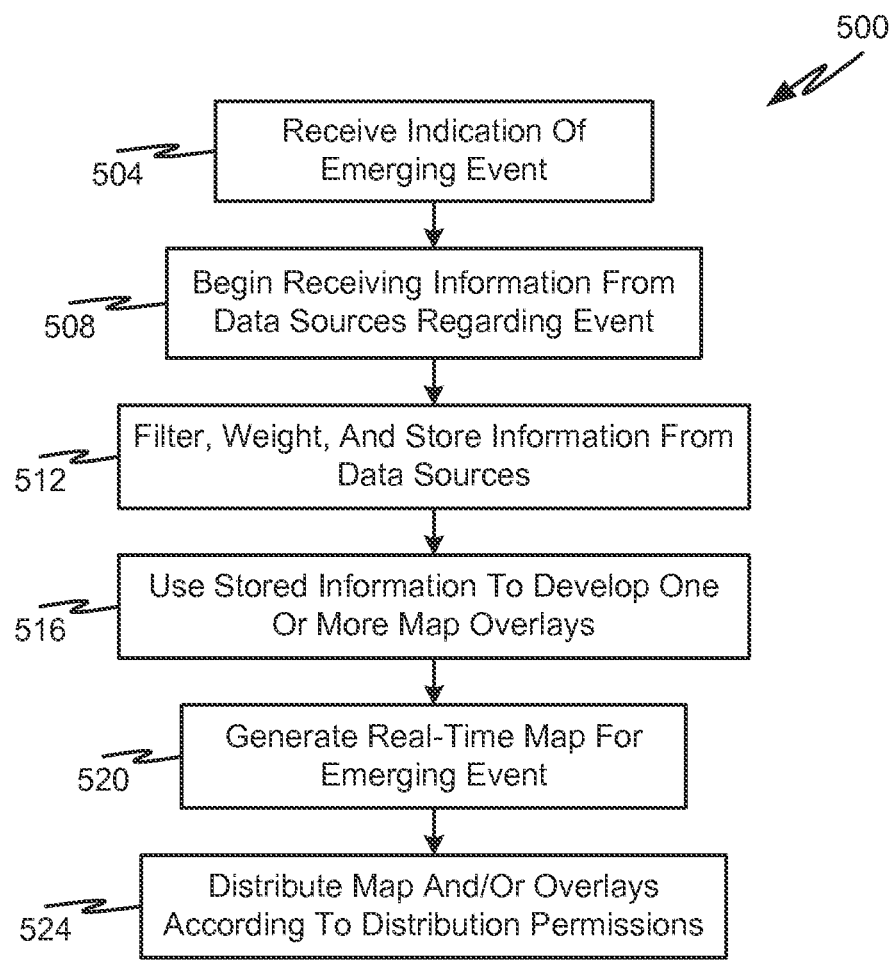
FIG. 5 is a flow chart depicting a method of generating and distributing map and/or overlays in accordance with embodiments of the present disclosure.

With reference now to FIG. 5, an illustrative example of a method 500 for generating and distributing maps and/or overlays will be described in accordance with embodiments of the present disclosure. The method 500 begins when an indication of an emerging event is received at a mapping server or module (step 504). The mapping server or module then begins receiving information from one or multiple data sources regarding the event (step 508). In some embodiments, the data sources direct the information toward the mapping server or module (e.g., via messages addressed to the mapping server or module). In some embodiments, the mapping server or module requests or passively observes the information from the data sources (e.g., by web crawling techniques, by RSS feeds, by analyzing key words or phrases in social media feeds, etc.).

The information received at the mapping server or module may then be filtered, weighted, and stored in one or multiple databases (step 512). The filtering and weighting of information from data sources may be performed at the mapping server or module. Alternatively or additionally, the filtering and weighting of information from data sources may be performed by the data sources themselves (e.g., a data source may assign a confidence weighting to a particular piece of data whereas the mapping server or module may assign a separate confidence weighting to the data source itself). In embodiments where weighting of data sources and the information communicated thereby is done separately (e.g., where the data source weights each piece of information and the mapping server or module weights the data source overall), then a combination of both weightings may be applied by the mapping server or module to determine an overall trustworthiness of the specific piece of information from a particular data source. As a non-limiting example, a data source having a trust weighting assigned thereto by the mapping server or module of 0.9 may have every piece of its information weighted by 0.9 (out of a possible 1.0 for fully trusted data and data sources), even if the data source weights different pieces of information differently. Continuing the example, if the data source individually weights a piece of information with a weight of 0.7, then the total weighting applied to that piece of information by the mapping server or module may be (0.7)*(0.9) or 0.63.

The weighting for the individual piece of information may be stored as metadata or some other tag along with the information itself. This stored information may then be used to develop one or maps or map overlays (step 516). As maps or map overlays are generated, then real-time maps for the event can be updated and presented to a call center agent, first responders, and other desired recipients of the maps and/or overlays (steps 520, 524). As can be appreciated, the distribution of maps and/or overlays may be restricted or limited based on distribution rules or policies. Alternatively or additionally, subscription preferences for maps and overlays by map consumers can drive where maps and/or overlays are distributed.

Figure 6:
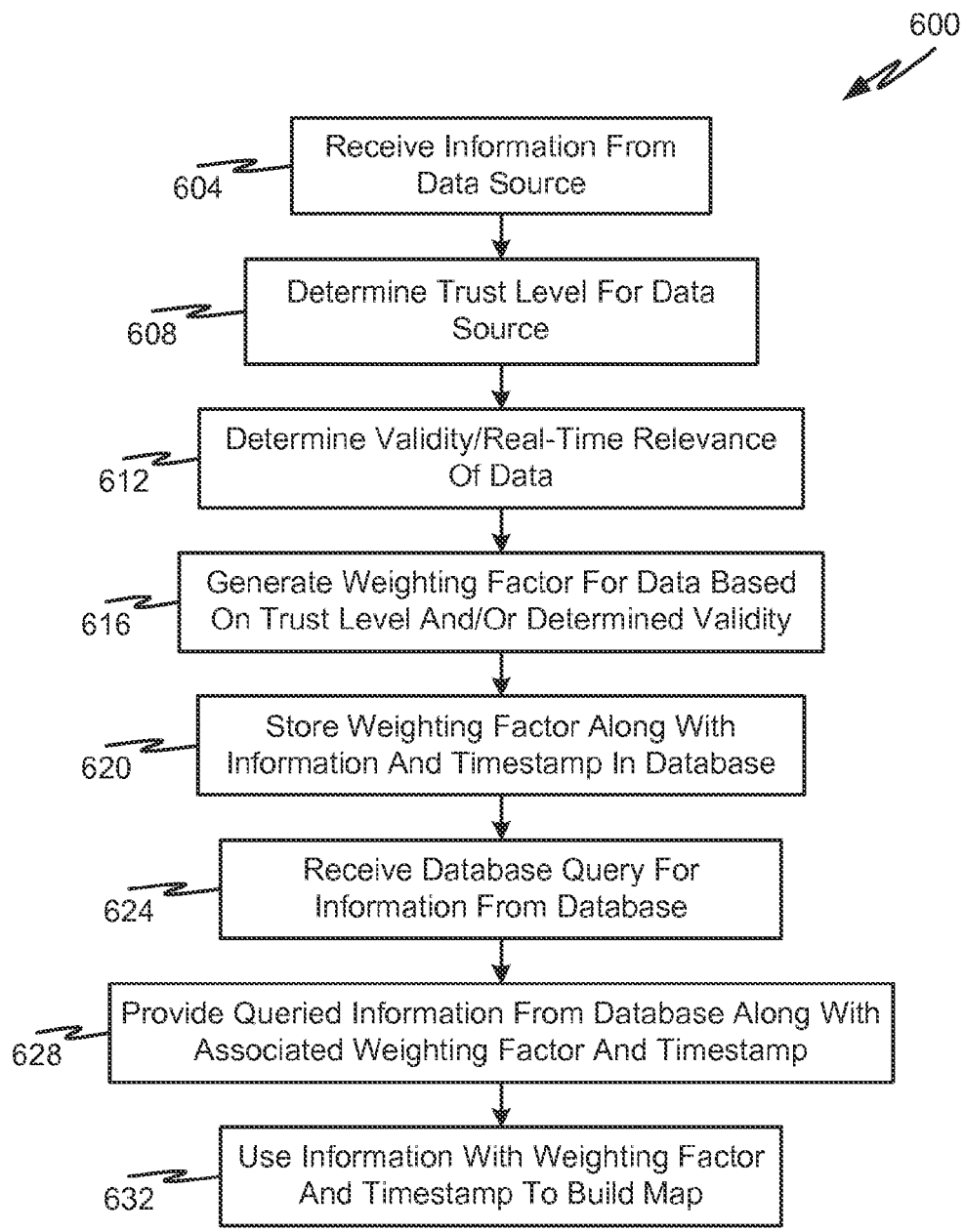
FIG. 6 is a flow chart depicting a method of weighting information from data sources in accordance with embodiments of the present disclosure.

With reference now to FIG. 6, an illustrative method 600 of using information with a weighting factor and other information to build a map and/or overlay will be described in accordance with at least some embodiments of the present disclosure. The method 600 begins when information is received from a data source at a mapping server or module (step 604). The method 600 continues by determining a trust level for the data source (step 608). In some embodiments, the trust level may be asserted by the data source. In some embodiments, the trust level may be determined independently by the mapping server or module based on previous interactions with the data source or based on third-party certifications. Alternatively or additionally, the trust level may be determined by performing an authentication protocol with the data source (e.g., one or more query and response exchanges) to determine that the data source is functioning in real-time and responsive to queries.

The method 600 continues by determining the validity/real-time relevance of the information received from the data source (step 612). In some embodiments, this may be based on comparisons with information received from other data sources in a similar area to the reporting data source. In some embodiments, this may be based on a timestamp received along with the information. In some embodiments, this may be based on an analysis of when the message was transmitted by the data source.

The mapping server or module then generates a weighting factor for the information received from the data source based on the trust level and/or determined validity/real-time relevance (step 616). This weighting factor is then stored along with the received information and a timestamp (if desired) in a database (step 620). The format of the database and the format with which the information, weighting factor, and/or timestamp are stored can vary and should not be construed as being limited to any particular type of database or data storage format.

Once the information, weighting factor, and optional timestamp are stored in the database, the stored information is available for reference by a mapping server or module in connection with making a map or overlay. In particular, the database may receive a query for information from the mapping server or module (step 624). The database query may be formatted appropriately for the type of database being used (e.g., SQL, noSQL, graph database, etc.) and may contain an identification of the exact information desired from the database or one or more filter/criteria to be used in selecting a plurality of entries from the database.

The information meeting the criteria of the query is then formatted and provided to the requesting entity (e.g., the mapping server or module) along with other relevant information such as the weighting factor, timestamp, etc. (step 628). The information can then be used by the mapping server or module to generate maps and/or overlays for maps that have a timing relevant to the timing with which the information was stored in the database (step 632).

Figure 7:
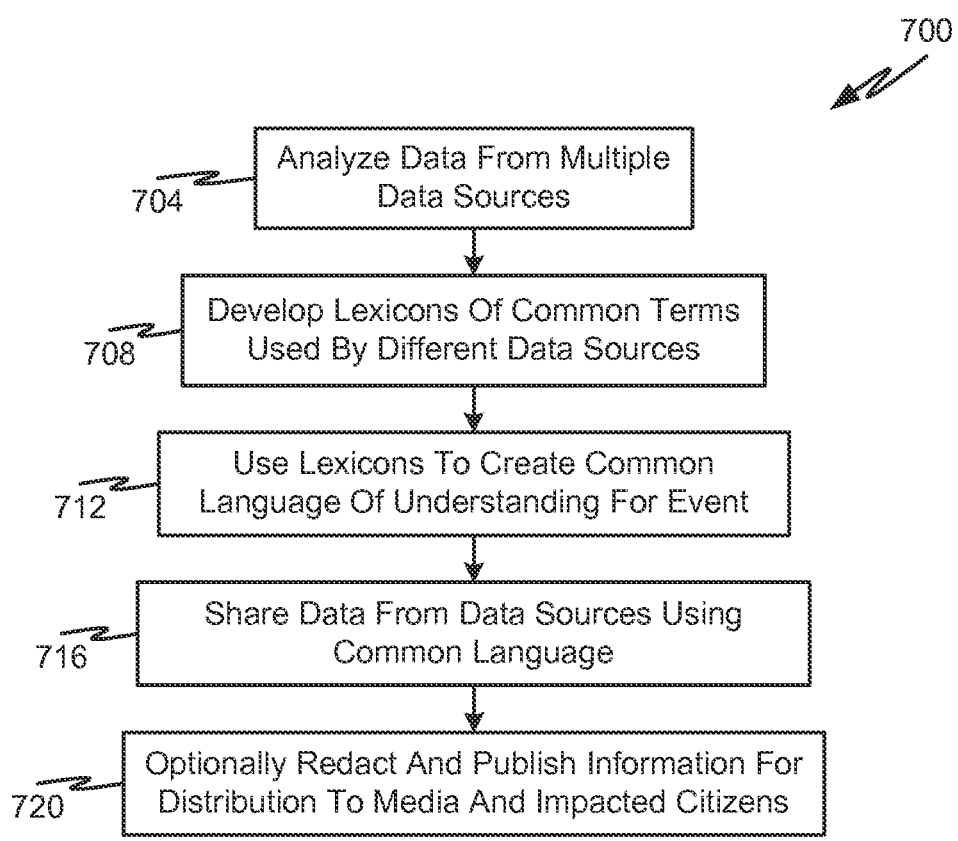
FIG. 7 is a flow chart depicting a method of developing and using a common language for an event in accordance with embodiments of the present disclosure.

With reference now to FIG. 7, a method 700 of controlling the distribution of map and/or overlays for maps will be described in accordance with at least some embodiments of the present disclosure. The method 700 begins with the data communication broker analyzing data from multiple data sources (step 704). In some embodiments, the various data sources may use different terminology or lexicons for the same terms or things. For instance, one data source may refer to the center or origin of an event as an epicenter, while another data source may refer to the center or origin of an event as ground zero. Furthermore, when the different data sources use different native languages (e.g., French, English, German, Spanish, etc.) or dialects within one language (e.g., Mandarin, Wu, Gan, Xiang, etc. within Chinese), the data communication broker may determine the different lexicons used by each data source to refer to the common terms. Thus, as the data communication broker analyzes the data from multiple data sources, the data communication broker may begin to develop lexicons of common terms used by the various data sources (step 708).

The data communication broker may then use these lexicons to create a common language of understanding for the event (step 712). While the map, overlays, and other graphical representations of an event help to provide an easily understandable (e.g., globally understandable) communication modality for an event, even across language barriers, the data communication broker may be able to generate labels for the maps and/or overlays that utilize the common language of understanding for the event. For instance, if a majority of data sources use the same term in their lexicon for a given object, then the data communication broker may use that same term to refer to the given object based on the assumption that a majority of the data consumer and first responders will also understand the same term for the given object.

Thus, the method 700 proceeds with the data communication broker sharing the data from the data sources using the common language (step 716). This data may be shared as part of a map or overlay (e.g., as labels on the map or overlay). Alternatively or additionally, this data may be shared as part of a report that is not in map form. Alternatively or additionally, this data may be shared as an aural presentation of the map and/or overlay. In some embodiments, the distribution of the map and/or overlay information along with the common language data may be redacted and published for distribution to media and impacted citizens (e.g., via social media feeds) (step 720). In some embodiments, method 700 may also provide the ability to present multiple languages, dialects, and/or terms via the map to aid in map interpretation when no single term is effective. Such a customization of the map and/or overlay (e.g., a language/label overlay) would be useful in aiding people of different languages or dialects to be able to interpret the common presentation of a map or overlay. In some embodiments, the language/label information could be presented in a matrix form where one axis of the matrix identifies language and/or dialect and the other axis of the matrix provides the various terms for an object being presented via the map.

Figure 8:
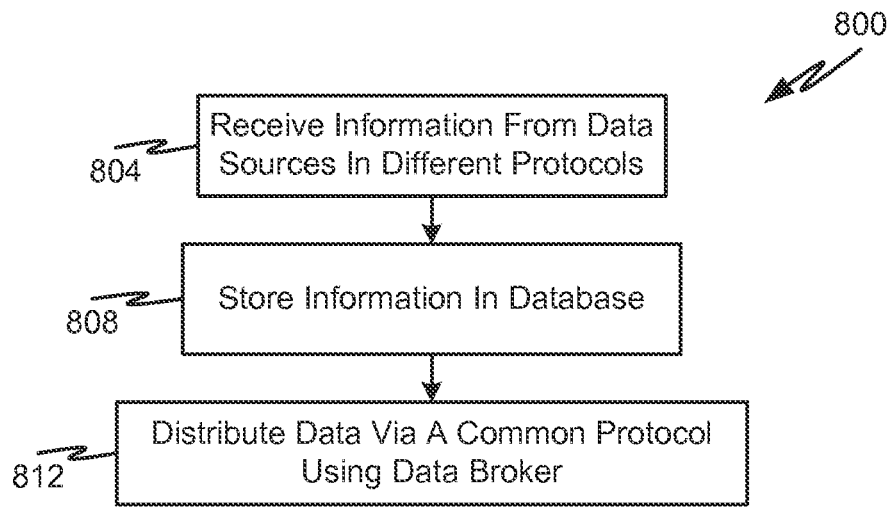
FIG. 8 is a flow chart depicting a method of distributing information with a data broker in accordance with embodiments of the present disclosure.

With reference now to FIG. 8, a method 800 of communicating information from multiple different data sources will be described in accordance with at least some embodiments of the present disclosure. The method 800 begins when information from different data sources is received at the data communication broker (step 804). The data communication broker or any other entity that received the information from the data sources may store the information along with any relevant metadata in a database (step 808). In some embodiments, this information may be received via one or a plurality of different communication protocols. The communication protocols used to receive the information from the data sources may depend upon the capabilities of the data sources. Examples of the different communication protocols that may be used include, without limitation, SIP, HTML, etc. The data communication broker may cause the information to be stored in the database in a protocol-agnostic format such that the information can be later shared with some or all data sources and/or first responders using a common protocol (step 812). Examples of the types of protocols that can be used to enable different communication systems to share the data include, without limitation, XML, SOAP, etc. Thus, the data communication broker enables the dissimilar systems (e.g., different data sources) to share data with one another.

Figure 9:
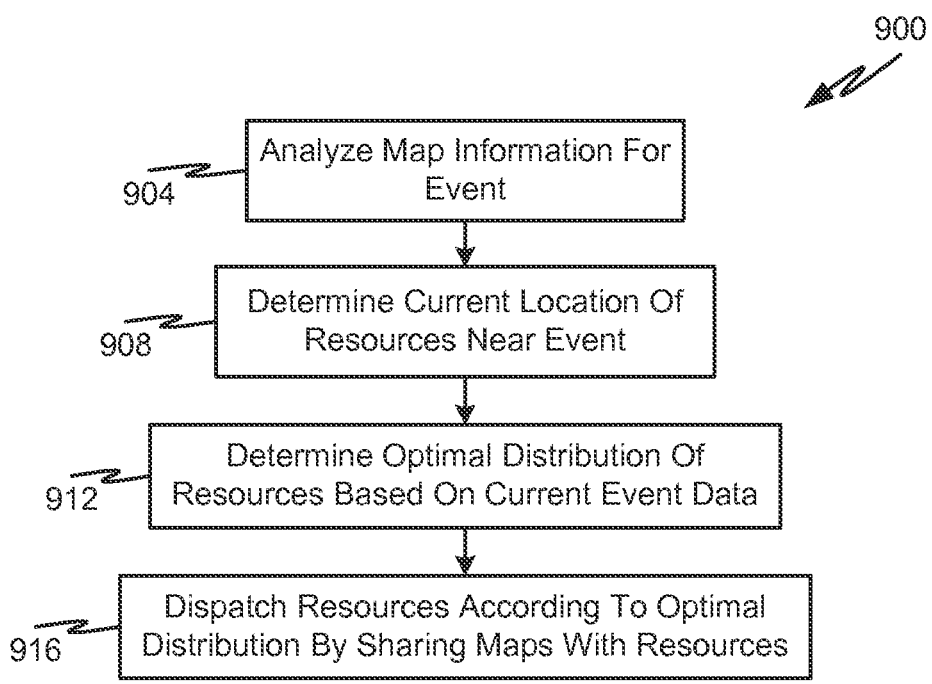
FIG. 9 is a flow chart depicting a method of dispatching resources by sharing maps in accordance with embodiments of the present disclosure.

With reference now to FIG. 9, a method 900 of distributing resources, such as first responder resources, for an emergency or emerging event will be described in accordance with at least some embodiments of the present disclosure. The method 900 begins when a call center agent or similar dispatch personnel analyzes the map information being generated in real-time for an event (step 904). The map information that is analyzed may correspond to a real-time map or overlay being updated with information from various data sources.

Based on the analysis of the current map information, the dispatch personnel determines the current location of resources (e.g., first responder resources) near or within a predetermined proximity of an event or an epicenter of an event (step 908). Depending upon the current location of the various resources, the dispatch personnel can determine an optimal distribution of the resources (step 912). As can be appreciated, since the mapping server or module is generating map and/or overlays based on information from multiple different data sources, the dispatch personnel may be viewing the locations of different responder resources from different entities. Thus, the dispatch personnel can be used to dispatch the multiple resources from different entities in an organized fashion. In some embodiments, the dispatch instructions can be shared with the various first responder resources by sharing the maps and/or overlay information with the resources (step 916). In particular, graphical representations of current locations and desired destination locations for each first responder can be presented to the first responder via their communication device. If each first responder follows their respective dispatch instructions (e.g., by following the map guidance provided on their graphical representation of their map), then the plurality of first responder resources will be properly coordinated, even though they may be resources of different entities or systems and may not necessarily speak the same language or use the same communication protocols. The shared map information effectively communicates the current and desired locations for every first responder resources, thereby allowing each resource to know where the other resources are currently located and their desired destinations.

Figure 10:
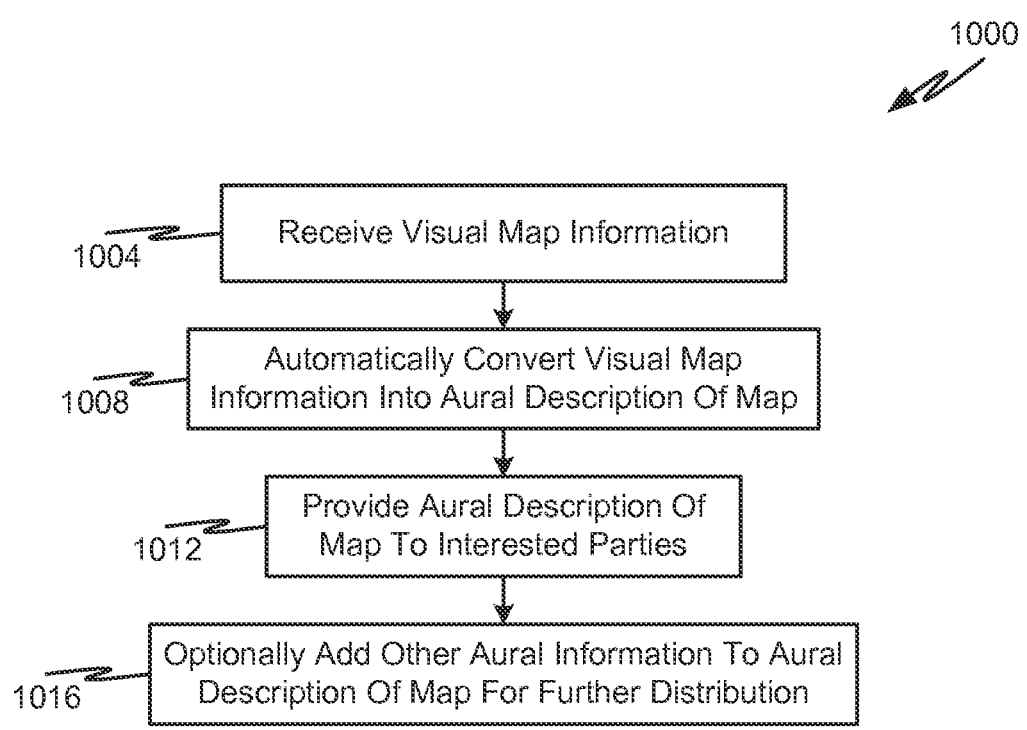
FIG. 10 is a flow chart depicting a method of converting map information to aural information and distributing the aural information in accordance with embodiments of the present disclosure.

With reference now to FIG. 10, a method 1000 of distributing map and/or overlays will be described in accordance with at least some embodiments of the present disclosure. The method 1000 begins with a mapping server or module receiving visual map information (step 1004). The mapping server or module may automatically convert some or all aspects of the visual map information into an aural description of the map (step 1008). The aural description of the map may include aural descriptions of locations of points of interest relative to data sources, desired destinations for first responder resources relative to their current location, current locations of data sources, current locations and status of certain items near an event, etc. Some or all of this aural description may be provided to interested parties, which may include first responders, normal users, dispatch personnel, call center agents, etc. (step 1012).

In some embodiments, the method 1000 may further include an optional step of adding other aural information to the aural description of the map (step 1016). This additional aural information may include additional aural inputs by social media users, human operators (e.g., call center agents), etc. The additional aural information may include various descriptions of items or points of interest that have been eye-witnessed by users or first responders in the affected area. The additional aural information can be added to the other aural description of the map and/or overlay for playback to all users.

Figure 11:
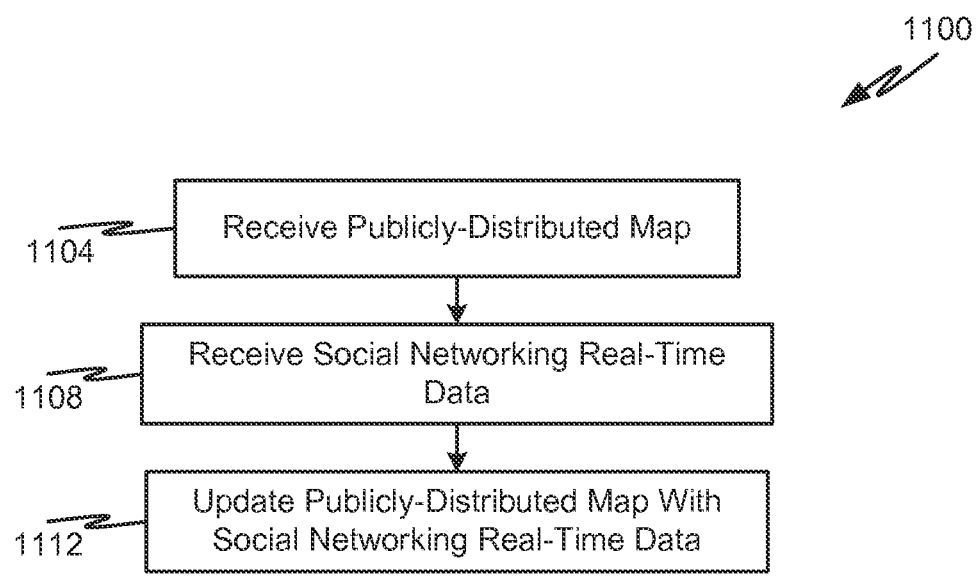
FIG. 11 is a flow chart depicting a method of updating a map with real-time social network data in accordance with embodiments of the present disclosure.

With reference now to FIG. 11, a method 1100 of enabling the updating of map and/or overlay information with additional information will be described in accordance with at least some embodiments of the present disclosure. The method 1100 begins when publicly-distributed map and/or overlay information is received by users in the general public (step 1104). The method 1100 continues by receiving social networking data in real-time (step 1108). The social networking data may include trending topics, eye witness accounts, real-time photos or videos of an event or items near an event, etc. This social network data, when received, may also include timestamp information and/or location information identifying the location from which the social networking data originated.

Based on the received social networking data, the map and/or overlay (or portions thereof) may be updated to include some or all of the social networking real-time data (step 1112). In some embodiments, the updated map may correspond to a particular overlay (e.g., a social networking overlay) that can be selectively viewed or not viewed by the recipients of the updated map. In other words, by making the social networking information part of an overlay, a user can be more easily decide whether to view the updated social networking information and/or not view the social networking information along with other map data. Thus, as users update their social networking accounts, the overlay for the social networking information can be updated and distributed to a larger population, which may include users other than those users that are connected to/following the users that are updating the map and/or overlay with their social networking accounts.

In the foregoing description, for the purposes of illustration, methods were described in a particular order. It should be appreciated that in alternate embodiments, the methods may be performed in a different order than that described. It should also be appreciated that the methods described above may be performed by hardware components or may be used to improve the performance of machines by being implemented in sequences of machine-executable instructions, which may be used to cause a machine, such as a general-purpose or special-purpose processor (GPU or CPU) or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions.

Also, it is noted that the embodiments were described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

While illustrative embodiments of the disclosure have been described in detail herein, it is to be understood that the inventive concepts may be otherwise variously embodied and employed, and that the appended claims are intended to be construed to include such variations, except as limited by the prior art.

What is claimed is:

1. A method, comprising:
receiving information about an event from a plurality of data sources;
determining, by a processor, at least one of location and time information associated with at least some pieces of information received from the plurality of data sources;
storing, by the processor, the at least some pieces of information along with the determined at least one of location and time information in a database;
accessing, by the processor, the database to obtain the at least some pieces of information along with the determined at least one of location and time information;
using, by the processor, the at least some pieces of information along with the determined at least one of location and time information to generate at least one of a map and a map overlay to provide a graphical understanding of the event at discrete points in time, wherein the at least one of a map and map overlay comprises at least one common term determined by analyzing different lexicons used by different data sources to describe a common object; and
distributing, by the processor, the at least one of a map and map overlay.

2. The method of claim 1, wherein the at least one of a map and map overlay are distributed to communication devices of first responder resources and wherein the at least one of a map and map overlay depict current locations of first responder resources along with destination locations for at least some of the first responder resources.

3. The method of claim 2, wherein the first responder resources comprise first responder resources from multiple different responding entities, at least some of which use different communication protocols or languages to communicate with one another, and wherein the at least one of a map and map overlay include a common language description of at least some points of interest.

4. The method of claim 3, wherein the plurality of data sources comprise different response agencies and wherein location information for the first responder resources is shared with all of the different response agencies.

5. The method of claim 1, further comprising:
determining a trustworthiness weight for the plurality of data sources;
determining a trustworthiness weight for the at least some pieces of information received from the plurality of data sources;
combining the trustworthiness weight for a data source with the trustworthiness weight for each piece of information received from the data source to obtain a combined trustworthiness weight for each piece of information received from the data source; and
storing the combined trustworthiness weight in the database along with the piece of information for which the combined trustworthiness weight was calculated.

6. The method of claim 5, further comprising:
using the combined trustworthiness weight to generate the at least one of a map and map overlay.

7. The method of claim 6, wherein a first piece of information having a first combined trustworthiness weight is used to influence the generation of the at least one of a map and map overlay more than a second piece of information having a second combined trustworthiness weight that is less than the first combined trustworthiness weight.

8. The method of claim 5, wherein the trustworthiness weight for the at least some pieces of information is based on a timeliness of the information.

9. The method of claim 8, wherein the trustworthiness weight for the data source is based on at least one of: (i) previous interactions between the data source and an entity generating the at least one of a map and map overlay; (ii) third-party assertions of credibility for the data source; and (iii) assertions of credibility made by the data source.

10. The method of claim 1, wherein the at least one of a map and map overlay is updated with information from a social media user and wherein the updated at least one of a map and map overlay is distributed to other social media users that are not connected with the social media user.

11. The method of claim 1, further comprising:
developing an aural description of the at least one of a map and map overlay; and
providing the aural description of the at least one of a map and map overlay to an interested entity.

12. The method of claim 1, further comprising:
redacting at least some portions of the at least one of a map and map overlay; and
providing the redacted at least one of a map and map overlay to a media outlet for public distribution.

13. A communication system, comprising:
a server comprising:
a network interface that enables the server to receive information about an event from a plurality of data sources;
a processor; and
memory that includes processor executable instructions that, when executed by the processor, cause the server to:
determine at least one of location and time information associated with at least some pieces of information received from the plurality of data sources;
use the at least some pieces of information along with the determined at least one of location and time information to generate at least one of a map and a map overlay to provide a graphical understanding of the event at discrete points in time, wherein the at least one of a map and map overlay comprises at least one common term determined by analyzing different lexicons used by different data sources to describe a common object; and
distribute the at least one of a map and map overlay to a plurality of different responder resources from different emergency response entities.

14. The communication system of claim 13, wherein the different emergency response entities communicate using at least one of dissimilar languages, dissimilar dialects, and dissimilar communication protocols.

15. The communication system of claim 13, wherein the at least one of a map and map overlay enable the different emergency response entities to view locations of the plurality of different responder resources, including responder resources that are not a part the viewing emergency response entity.

16. The communication system of claim 13, wherein the at least one of a map and map overlay are generated using trustworthiness weights determined, at least in part, based on whether or not the pieces of information have been recently produced by the plurality of data sources.

17. The communication system of claim 13, wherein the server is part of a call center.

18. A non-transitory computer-readable medium comprising processor-executable instructions, the instructions comprising:
instructions configured to determine at least one of location and time information associated with pieces of information received from a plurality of data sources, wherein the pieces of information describe an event;
instructions configured to store the pieces of information along with the determined at least one of location and time information in a database;
instructions configured to use the pieces of information along with the determined at least one of location and time information to generate at least one of a map and a map overlay to provide a graphical understanding of the event at discrete points in time, wherein the at least one of a map and map overlay comprises at least one common term determined by analyzing different lexicons used by different data sources to describe a common object; and
instructions configured to distribute the at least one of a map and map overlay to communication devices of first responders.

19. The computer-readable medium of claim 18, wherein the instructions configured to distribute the at least one of a map and map overlay comprise distribution rules that limit distribution of the at least one of a map and map overlay to entities having permissions to receive the at least one of a map and map overlay.

* * * * *